(12) United States Patent
Mills et al.

(10) Patent No.: US 9,032,032 B2
(45) Date of Patent: May 12, 2015

(54) DATA REPLICATION FEEDBACK FOR TRANSPORT INPUT/OUTPUT

(75) Inventors: David Mills, North Bend, WA (US);
Todd Luttinen, Redmond, WA (US);
Victor Boctor, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 929 days.

(21) Appl. No.: 12/146,553

(22) Filed: Jun. 26, 2008

(65) Prior Publication Data
US 2009/0327361 A1 Dec. 31, 2009

(51) Int. Cl.
*G06F 17/30* (2006.01)
*G06F 11/14* (2006.01)
*G06F 11/20* (2006.01)

(52) U.S. Cl.
CPC ........ *G06F 11/1443* (2013.01); *G06F 11/2097* (2013.01); *G06F 2201/835* (2013.01)

(58) Field of Classification Search
CPC . H04L 51/22; G06F 2201/835; G06Q 10/107
USPC .......................................... 707/692; 709/206
See application file for complete search history.

(56) References Cited

U.S. PATENT DOCUMENTS

| | | | |
|---|---|---|---|
| 6,192,365 B1 | 2/2001 | Draper et al. | |
| 6,449,734 B1 | 9/2002 | Shrivastava et al. | |
| 2002/0112008 A1* | 8/2002 | Christenson et al. | 709/206 |
| 2002/0126594 A1* | 9/2002 | Denda et al. | 369/47.12 |
| 2003/0061240 A1* | 3/2003 | McCann et al. | 707/200 |
| 2003/0084361 A1* | 5/2003 | Lawrence et al. | 713/400 |
| 2003/0208511 A1 | 11/2003 | Earl et al. | |
| 2004/0201737 A1* | 10/2004 | Baron et al. | 348/231.2 |
| 2004/0212639 A1* | 10/2004 | Smoot et al. | 345/752 |
| 2005/0125558 A1 | 6/2005 | Holden et al. | |
| 2005/0144189 A1* | 6/2005 | Edwards et al. | 707/102 |
| 2005/0228867 A1* | 10/2005 | Osborne et al. | 709/206 |
| 2005/0289152 A1 | 12/2005 | Earl et al. | |
| 2006/0010227 A1 | 1/2006 | Atluri | |
| 2006/0136686 A1 | 6/2006 | Cherkauer et al. | |
| 2006/0168120 A1* | 7/2006 | Parham | 709/218 |
| 2006/0179061 A1 | 8/2006 | D'Souza et al. | |

(Continued)

FOREIGN PATENT DOCUMENTS

KR    10-1999-0038957    6/1999

OTHER PUBLICATIONS

Article entitled "More on Continuous Replication", by Schnoll, dated Oct. 30, 2006.*

(Continued)

*Primary Examiner* — Mahesh Dwivedi
(74) *Attorney, Agent, or Firm* — Louise Bowman; Stein Dolan; Micky Minhas

(57) ABSTRACT

Architecture for efficiently ensuring that data is stored to the desired destination datastore such as for replication processes. A copy of data (e.g., messages) sent to a datastore for storage is stored at an alternate location until a received signal indicates that the storage and replication was successful. As soon as the feedback signal is received, the copy is removed from the alternate location, and hence, improves input/output (I/O) and storage patterns. The feedback mechanism can also be used for monitoring the status of data transport associated with log shipping, for example, and taking the appropriate actions when storage (e.g., replication) is not being performed properly.

13 Claims, 7 Drawing Sheets

(56) References Cited

U.S. PATENT DOCUMENTS

| | | | |
|---|---|---|---|
| 2006/0212439 A1 | 9/2006 | Field | |
| 2007/0022145 A1* | 1/2007 | Kavuri | 707/204 |
| 2007/0033237 A1* | 2/2007 | Prahlad et al. | 707/204 |
| 2007/0168516 A1* | 7/2007 | Liu et al. | 709/226 |
| 2007/0204275 A1* | 8/2007 | Alshab et al. | 719/313 |
| 2007/0220059 A1 | 9/2007 | Lu et al. | |
| 2007/0226365 A1* | 9/2007 | Hildreth et al. | 709/231 |
| 2007/0283081 A1* | 12/2007 | Lasser | 711/103 |
| 2008/0034003 A1* | 2/2008 | Stakutis et al. | 707/200 |
| 2008/0071867 A1* | 3/2008 | Pearson et al. | 709/206 |
| 2009/0006564 A1* | 1/2009 | Kay et al. | 709/206 |
| 2009/0327805 A1* | 12/2009 | Thiel et al. | 714/15 |

OTHER PUBLICATIONS

Article entitled "Cluster Continuous Replication" by Microsoft, dated Mar. 21, 2008.*

Article entitled "Continuous Architecture Replication and Behavior" by Schnoll, dated Oct. 6, 2006.*

International Search Report and Written Opinion for PCT Patent Application No. PCT/US2008/067547, dated Dec. 10, 2008, 4 pages.

Otey, et al., "Choosing a Database for High Availability: An Analysis of SQL Server and Oracle", Apr. 2005, Microsoft Corporation.

"High Availability Deployments", 2008, Microsoft Corporation, Jan. 30, 2008.

* cited by examiner

DATA REPLICATION FEEDBACK FOR TRANSPORT INPUT/OUTPUT

BACKGROUND

Data management is an important facet of corporate profitability. Thus, ensuring the availability of the data to an enterprise is a primary objective of database administrators. Companies typically have multiple databases that need to be protected by backup and replication procedure. High availability techniques are employed to ensure that data is safely stored and readily available to user and system access. However, even the most effective and efficient techniques have limitations where small segments of data remain vulnerable to people, process and technology barriers.

Such is the case where data sent for storage (or replication) is not successfully stored at the destination system, and hence, needs to be resent expeditiously to complete the process. The data (which can be on the order of gigabytes in size) then has to be re-sent thereby consuming additional hardware and software resources at the server level and the network level.

The performance analysis associated with retaining a copy of the data at a remote location indicates that the files added to the remote location are at least twice as expensive as those files that are not. This is attributed to the lifetime of data that is added being much longer than the data delivered and deleted right away. The performance degrades as the lifetime of the data increases until the data is removed from the database memory cache or the data is removed from the database logs and is applied to the database causing random input/output operations.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

To that end, high availability architecture is disclosed for efficiently and effectively ensuring that data is stored to the desired destination datastore such as for replication processes. A copy of data (e.g., messages) sent to a datastore for storage is stored at an alternate location until a received feedback signal indicates that the storage and replication at the datastore was successful. As soon as the feedback signal is received, the copy is removed from the alternate location, and hence, improves input/output (I/O) and storage patterns. The feedback mechanism can also be used for monitoring the status of data transport associated with datastore replication using log shipping, for example, and taking the appropriate actions when storage (e.g., replication) is not being performed properly. In the context of log shipping, messages can be delivered by hub transport role to a mailbox role, and replication feedback ensures that copies of messages not replicated between mailbox role instances using log shipping are replayed based on timestamps in the event that log shipping detects loss.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
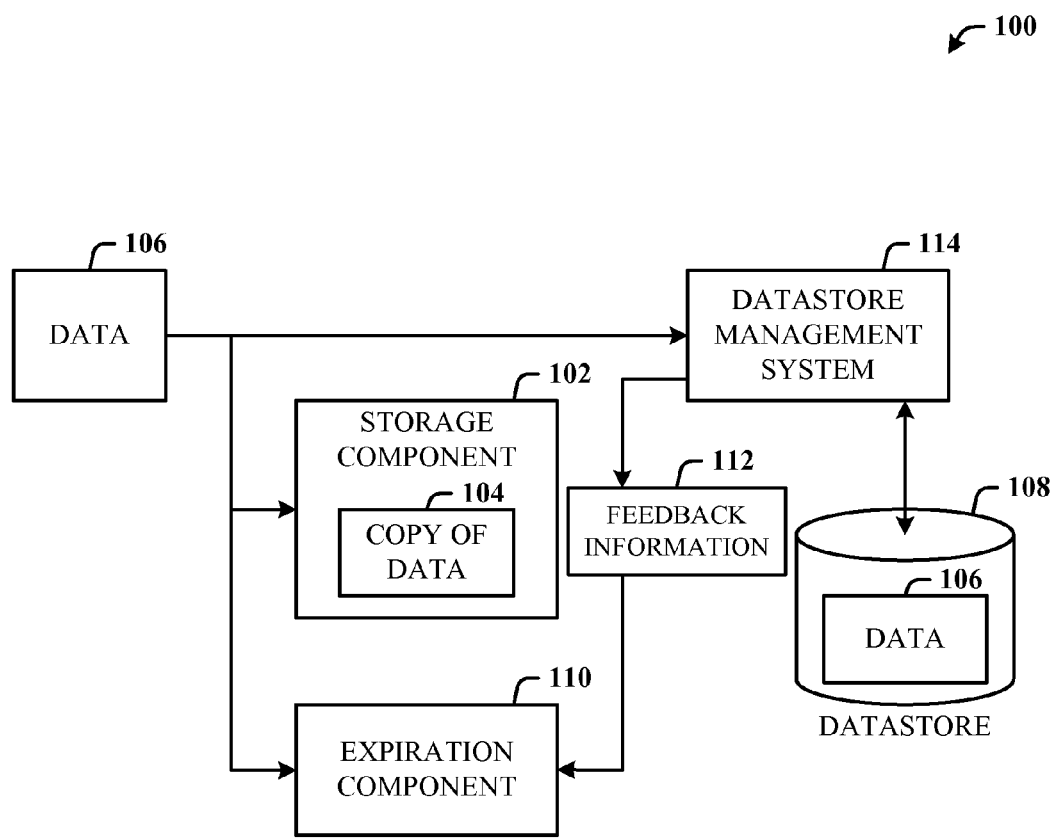
FIG. 1 illustrates a computer-implemented data management system in accordance with the disclosed architecture.

The disclosed architecture is an efficient mechanism for ensuring that data (e.g., messages) is stored to the desired destination datastore such as for replication processes. When sending data to a destination datastore, a copy is temporarily stored at an alternate location in case the copy is needed for remedying a faulty storage or replication process at the destination. In any case of successful initial storage and replication, or replay of the copy, a feedback mechanism is utilized for discarding the redundant data, and hence, improving input/output (I/O) and storage patterns. The feedback mechanism can also be used for monitoring the status of data transport associated with datastore replication using log shipping, for example, and taking the appropriate actions when storage (e.g., replication) is not being performed properly.

The entity that stores a copy of the data (that can be stored singularly or redundantly) is referred to herein as a dumpster. The dumpster is a software component that can be hosted on a transport server and used to complement data redundancy (e.g., mailbox in messaging systems), using log shipping, for example. In high availability systems, replicas of each database can be maintained, and log shipping and log replay can be used to keep the replicas in synchronism. However, in case of storage failures (e.g., replication), the latest data can be lost. The dumpster is used to resubmit the lost messages from the dumpster copy, and hence, provide an improved recovery process.

Performance analysis indicates that data (e.g., messages) added to the dumpster is at least twice as expensive (e.g., in terms of cost to retain and delete) as the data that is not added to the dumpster. This is attributed to the lifetime of data that is added to dumpster being much longer than the data that is delivered and promptly deleted. The lifetime of a dumpster data can be controlled by the following factors: the quota for the corresponding database/storage group and the maximum lifetime of the dumpster data (e.g., on the order of seven days).

The disclosed architecture provides dumpster protection for redundant data while reducing the I/O impact of the dumpster on transport. This is achieved by reducing the lifetime of the dumpster data (e.g., message) to the time where such data is known to be of value. In other words, the dumpster copy of the data is removed as soon as the original data is successfully stored (e.g., replicated) in the destination database and/or successfully replicated across the backend server replicas.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented data management system 100 in accordance with the disclosed architecture. The system 100 can include a storage component 102 for storing a copy 104 of data 106 sent to a datastore 108 for storage, and an expiration component 110 for expiring the copy 104 at the storage component 102 as soon as a received signal (of feedback information 112) indicates successful storage (and optionally, replication) of the data 106 at the datastore 108. The datastore 108 is associated with a datastore management system 114 for administration and management thereof. The datastore management system 114 sends the feedback information 112 to the expiration component 110 in the signal to indicate that the data 106 has been successfully stored in the datastore 108, and that the copy 104 can then be deleted from the storage component 102.

Note that the storage component 102 can be associated with a mid-tier server and/or a frontend server, for example. The datastore management system 114 can be one or more backend server systems. In other words, it can be the scenario where the copy 104 will be utilized for resubmission to multiple different datastore management systems. In this case, and in one embodiment, the last feedback signal received would be processed to remove the copy 104.

The signal can include timestamp information related to last successfully stored data. The storage component 102 discards data fully delivered to the datastore 108 before the time includes in the timestamp information. The discarded data is removed from a memory cache, for example, of the storage component 102. The data 106 can be messages sent to the datastore 108, which is a mailbox datastore, and the copy 104 of the messages is deleted from the storage component 102 when the messages are successfully stored (and replicated) to the mailbox datastore. In other words, it can be the case where as long as the messages are successfully stored at one of the backend server systems, this is sufficient to then delete the copy 104 from the storage component 102. Replication can then proceed at the backend without the copy 104 in existence, since a backend server has successfully stored the data. Alternatively, the copy 104 will be deleted only after both successful storage and replication. This can be made a configuration implementation.

Figure 2:
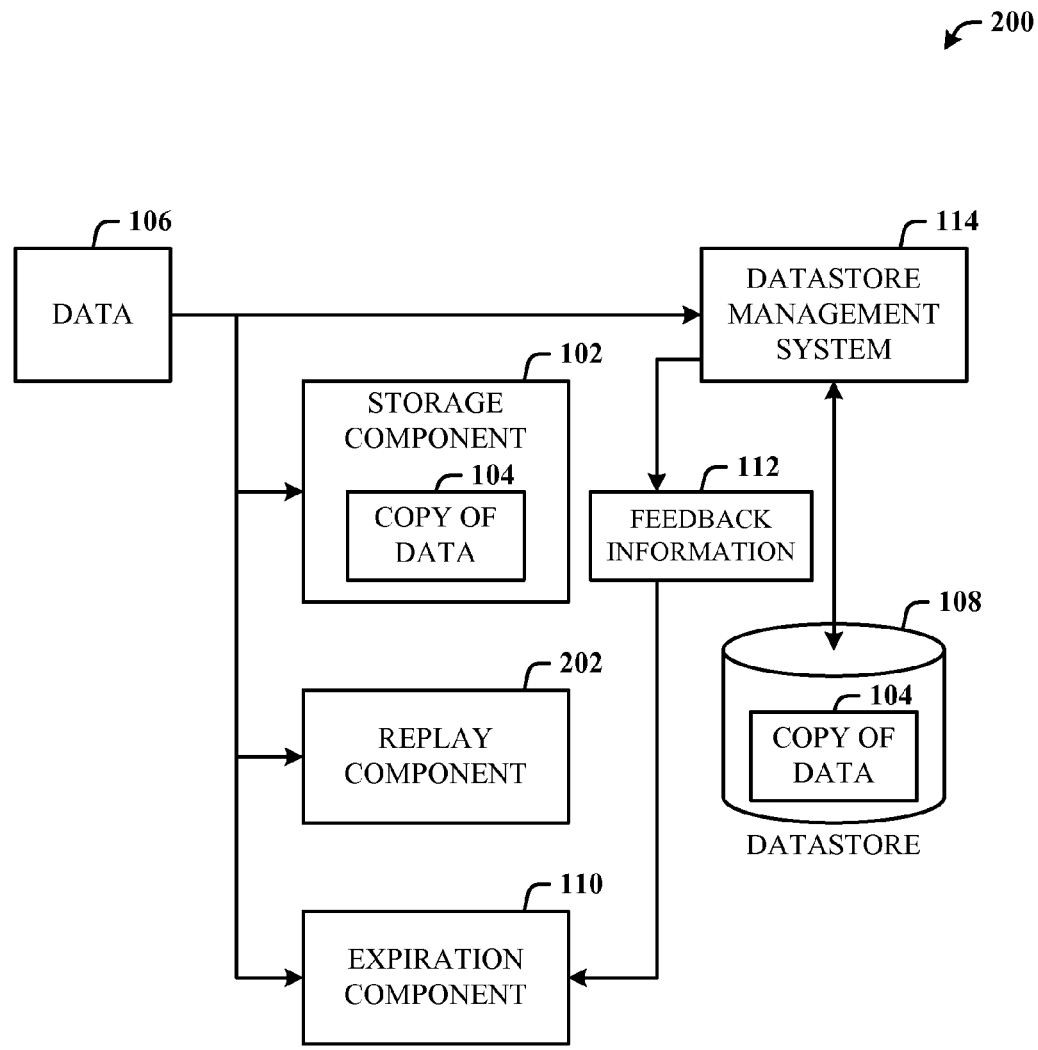
FIG. 2 illustrates a computer-implemented data management system that includes replay for replication failure, in accordance with the disclosed architecture.

FIG. 2 illustrates a computer-implemented data management system 200 that includes replay for replication failure, in accordance with the disclosed architecture. The system 200 includes the storage component 102 for storing the copy 104 of the data 106 sent to the datastore 108 for storage, and the expiration component 110 for expiring the copy 104 at the storage component 102 as soon as the received signal (of feedback information 112) indicates successful storage of the data 106 at the datastore 108.

The system 200 can further comprise a replay component 202 for replaying the copy 104 to the datastore 108 in response to a failure in the storage of the data 106 at the datastore 108. It is intended that the term "replay" is not to be construed as limited to a log shipping implementation, but includes the resubmission processes of data, generally. The expiration component 110 expires the copy 104 at the storage component 102 as soon as the received signal of feedback information 112 indicates successful storage (and optionally, replication) of the copy 104 at the datastore 108. Note that although the datastore 108 shows the copy 104, it is to be understood, as described in FIG. 1, that the copy 104 from the storage component 102 may never be utilized, if the data 106 is successfully stored (and replicated) at the datastore 108.

The description will continue in the context of the data being messages such as email, and performed as part of a log shipping process where the storage component 102 is part of a hub transport server; however, it is to be understood that the description also applies more broadly to data and data resubmission, as well. In the context of log shipping, messages can be delivered by hub transport role to a mailbox role, and replication feedback ensures that copies of messages not replicated between mailbox role instances using log shipping are replayed based on timestamps in the event that log shipping detects loss.

The messages are logged in a datastore log file and shipped to one or more alternate datastores as part of a log shipping process. When messages (104) are sent to the datastore for storage (as part of the storage component 108), the messages are copied into the dumpster (e.g., as part of the storage component 102), which can be part of the transport server. The dumpster copy of the messages can be removed in a timely manner by enhancing mailbox and hub transport servers to communicate information about a timestamp of the last successfully replicated log file between mailbox servers (one or more remote storage components 108). The hub transport server can then use the timestamp to discard all messages that were fully delivered before the specified timestamp. By implementing this feedback, the hub transport server can delete the dumpster messages quickly (e.g., a log file can typically be replicated within ten seconds from log file creation time) which makes the messages good candidates for deletion while still in the hub transport database cache and log files, thereby providing a reduction of the cost required to delete such messages from the datastore (e.g., database).

This approach provides a more efficient system in terms of storage and I/O, and also allows administrators to set higher dumpster quota limits (e.g., larger file size), knowing that the dumpster will use the storage space efficiently, and that the space will only be consumed when necessary.

The feedback mechanism also allows the hub transport server to be aware of issues that may occur with a mailbox log replication service. Hence, the transport server can take actions such as alerting the administrator, stopping deliveries to the datastore 108 where replication is not occurring, etc.

Figure 3:
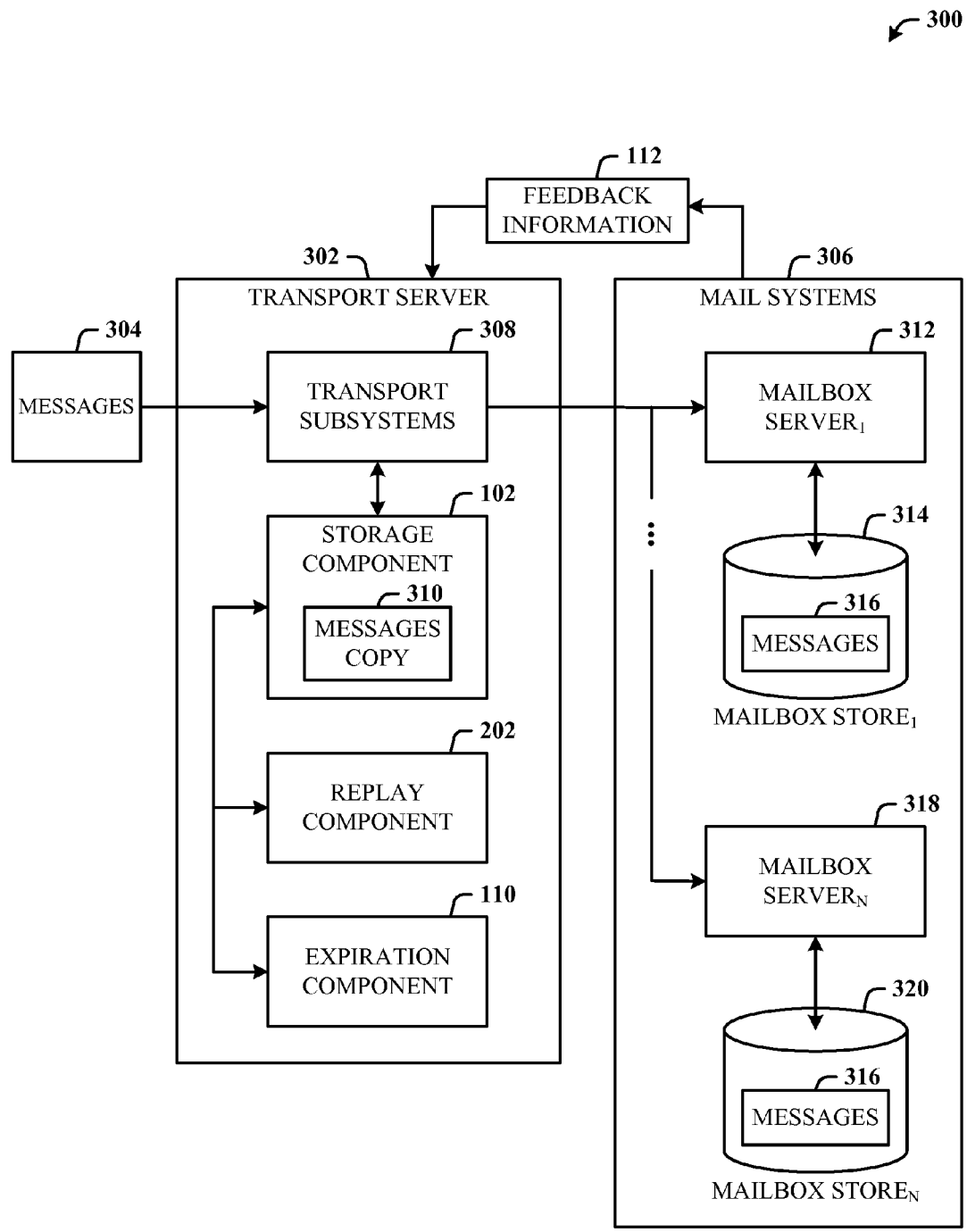
FIG. 3 illustrates an exemplary embodiment of a messaging system that employs feedback information to efficiently remove a message copy.

FIG. 3 illustrates an exemplary embodiment of a messaging system 300 that employs feedback information 112 to efficiently remove a message copy. The system 300 includes a transport server 302 that sends messages 304 to mail systems 306. The transport server 302 routes mail to the proper mailbox server in the mail systems 306 that employs cluster continuous replication (CCR). CCR is a high availability capability that combines asynchronous log shipping and replay technology with failover and management features of the cluster service. CCR uses the database failure recovery functionality to enable the continuous and asynchronous updating of a second (or passive) copy of a database with the changes that have been made to an active copy of the database. After the initial seeding of the passive copies is performed, log copying and replay are performed continuously.

Note that although described in the context of a transport server, the description applies equally as well for mid-tier servers, frontend servers, and any alternative location entities which can provide the storage component 102 and the associated functionality (e.g., replay, expiration) for resubmitting data should the mail system 306 experience problems that initiate lossy failover and switchover, for example.

The transport server 302 includes transport subsystems 308 that receive the messages 304 for communication to the mail systems 306. The transport subsystems 308 send a messages copy 310 of the messages 304 to the storage component 102 for storage when the messages are being sent to the mail systems 306. The storage component 102 can include a cache memory subsystem (not shown) that stores the copy 310 for fast processing.

The copy 310 will be utilized if storage (and optionally, replication) fails in the mail systems 306. For example, when a first mailbox system 312 receives the messages 304, the messages 304 may be stored successfully on the first mailbox store 314. Thereafter, replication in the mail systems 308 attempts synchronization (e.g., asynchronously) of the messages 316 from the first mailbox store 314 to the remaining N mailbox stores 320. If replication fails, for example, signals from the replication process are sent to the transport server 302 to initiate download of the copy 310 from the storage component 102 to the first mailbox server 312, which uses the copy 310 to obtain and store the messages 316 contained therein. Replication can then be repeated from the mailbox store (e.g., mailbox store 314) that received the copy 310.

Once the replication (or synchronization) process has been deemed successful, the mail systems 306 send the feedback information 112 to the transport server 302 to then delete the copy 310 from the storage component 102, thereby improving I/O and storage patterns.

The effect is to reduce the impact of I/O on transport server 302. This is achieved by reducing the lifetime of the storage component (or dumpster) messages of the copy 310 to the time where such messages are known to be of value. In other words, the storage component messages copy 310 is removed as soon as the corresponding database messages 316 are successfully stored (and optionally, replicated).

This is achieved by enhancing the transport server 302 and mailbox servers (e.g., 312 to 318) to communicate information (the feedback information 112) about the timestamp of the last successfully replicated log file. The transport server 302 can then use this timestamp to discard all messages that were fully delivered before the specified timestamp. By having such feedback information 112, the transport server 302 can delete the storage component messages in the messages copy 310 quickly (given that the messages 304 are typically replicated within ten seconds from creation time), which makes the messages copy 310 a good candidate for deletion while still in the transport server storage component 102 (e.g., database cache and log files). This further reduces the cost required to delete such messages from the database.

This approach provides an efficient system in terms of storage and I/O. This also allows administrators to set higher quota limits on the storage component 102 (or dumpster), knowing that storage component 102 will use such space efficiently, and that the space will only be consumed when necessary. This feedback mechanism also allows the transport server 302 to be aware of issues that may occur with a mailbox log replication service. Hence, the transport server 302 can take actions to alert the administrator, stop deliveries to the database that are not being replicated, etc.

In one particular implementation, the storage component 102 can be configured to incur no more than a fifteen percent input/output per second (IOPS) per message cost when database mobility is enabled. The storage component 102 resubmits message that match the time span requested in the redelivery request received from the mailbox role. The storage component 102 contains all messages that have been successfully delivered to a mailbox with database mobility enabled (within quota restrictions). Tolerance for clock skew of up to five seconds can be used between transport and mailbox roles.

Other characteristics of the storage component 102 can include the following. Messages are removed from the storage component 102 after a successful resubmission has occurred, and messages are added to the storage component 102 after successful re-delivery of a message that has been resubmitted. The oldest messages are removed from the storage component 102 when the quota for a specific database has been exceeded. An informational event log can be created for each redelivery request received from mailbox role including response status, for each resubmit request that has been begun processing, and for each resubmit request that has completed processing. Informational events can be logged with a periodic key that includes all insertion strings to prevent logging redundant information more than once every periodic interval (e.g., fifteen minutes).

With respect to time information, delivery time can be used or receive time can be used. If delivery time, the data stored in the storage component 102 and the resubmit timeframe can all be related to delivery time to a specific database (or storage group). When the mail item is delivered to a mailbox recipient, the recipient delivery time can be stamped.

First and last recipient delivery timestamps can be used, since the difference between the first recipient and last recipient delivery within same database can be significant due to removal of single instancing in store, at least in the case where the number of recipients is large. When expiring the copy 310 from the storage component 102, expiration can be based on the last recipient delivery timestamp. When resubmitting from the storage component 102, the resubmit time range can be checked against both first/last recipient delivery timestamps.

By expiring the copy 310 from the storage component 102 sooner, there is a higher likelihood that the messages of the copy 310 are deleted while still in the database cache of the transport server database. Fewer items in memory mean a smaller memory footprint and smaller lists to process. Moreover, less data stored in queue database means a smaller database and smaller restart time. This can be based on the delivery time timestamp.

Submissions from the storage component 102 can be managed using two pause modes: pause due to back pressure and pause due to service pause. For example, in the case of back pressure, the submissions from storage component 102 can be paused.

In other words, a computer-implemented data management system can be provided that includes the storage component 102 for storing a copy of messages sent to a mailbox server 312 for storage and replication, the replay component 202 for replaying the copy in response to a failure in replication of the messages at the mailbox server 312, and the expiration component 110 for expiring the messages at the storage component 102 as soon as the feedback information 112 is received that indicates successful storage (and optionally in addition to storage, replication) of the messages.

The feedback information 112 can include timestamp information related to a last successfully stored message of the messages. The storage component 102 discards messages that have been replicated to the mailbox server 312 before the timestamp. The timestamp can be based on a delivery time to the mailbox server 312. The storage component 102, replay component 202, and expiration component 110 are part of the transport server 302 (or a mid-tier or frontend server) that routes the messages to the mailbox server 312. The messages can be replicated to the mailbox server 312 and other mailbox servers 318 asynchronously, and the expiration component 110 expires the copy 310 as soon as successful storage (and replication) of the messages to the mailbox server 312 and other mailbox servers 318 occurs.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
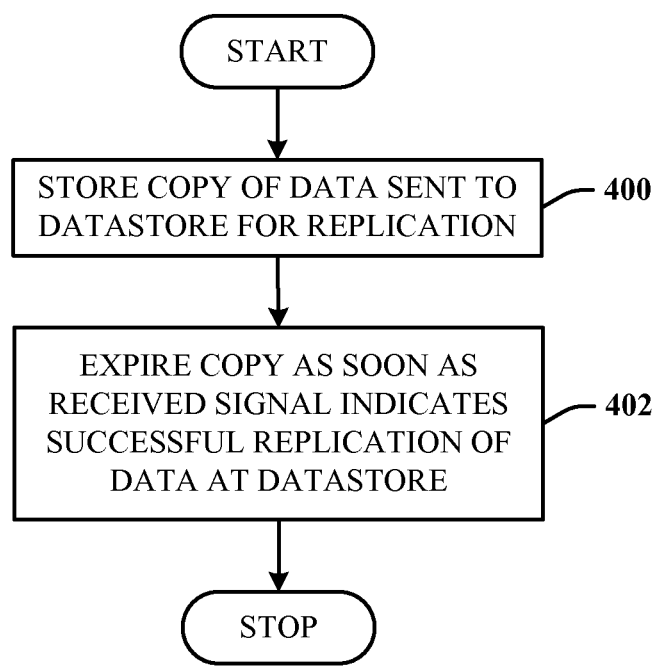
FIG. 4 illustrates a method of managing data.

FIG. 4 illustrates a method of managing data. At 400, a copy of data sent to a datastore for replication is stored. At 402, the copy is expired as soon as a received signal indicates successful replication of the data at the datastore.

Figure 5:
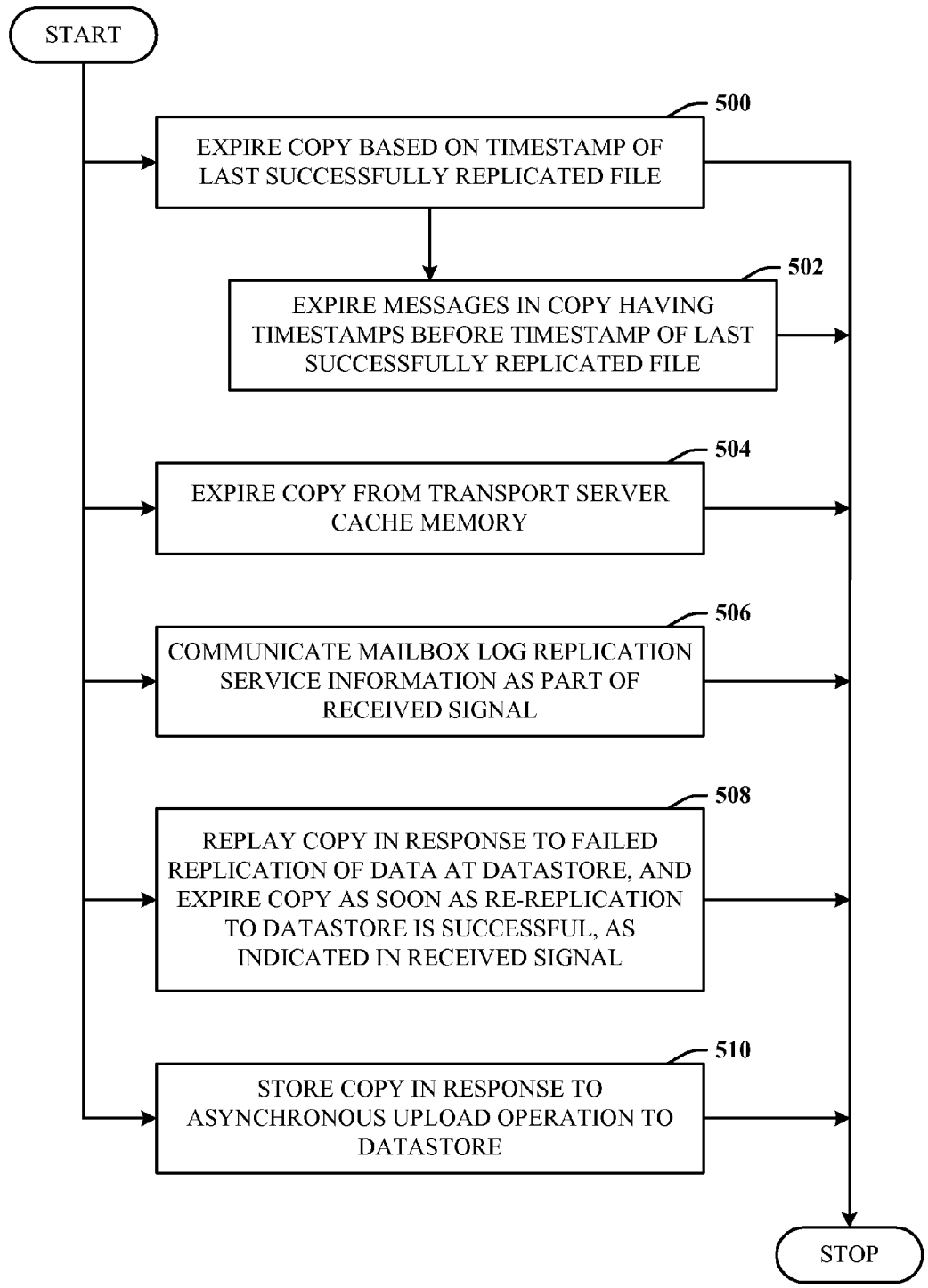
FIG. 5 illustrates further exemplary aspects of a computer-implemented data management method.

FIG. 5 illustrates further exemplary aspects of a computer-implemented data management method. At 500, the copy is expired based on a timestamp of a last successfully replicated file. At 502, messages in the copy that have timestamps before the before the timestamp of the last successfully replicated file are expired. At 504, the copy is expired from a transport server cache memory. At 506, mailbox log replication service information is communicated as part of the received signal. At 508, the copy is replayed in response to a failed replication of the data at the datastore, and the copy is expired as soon as re-replication to the datastore is successful, as indicated in the received signal. At 510, the copy is stored in response to an asynchronous upload operation to the datastore.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 6:
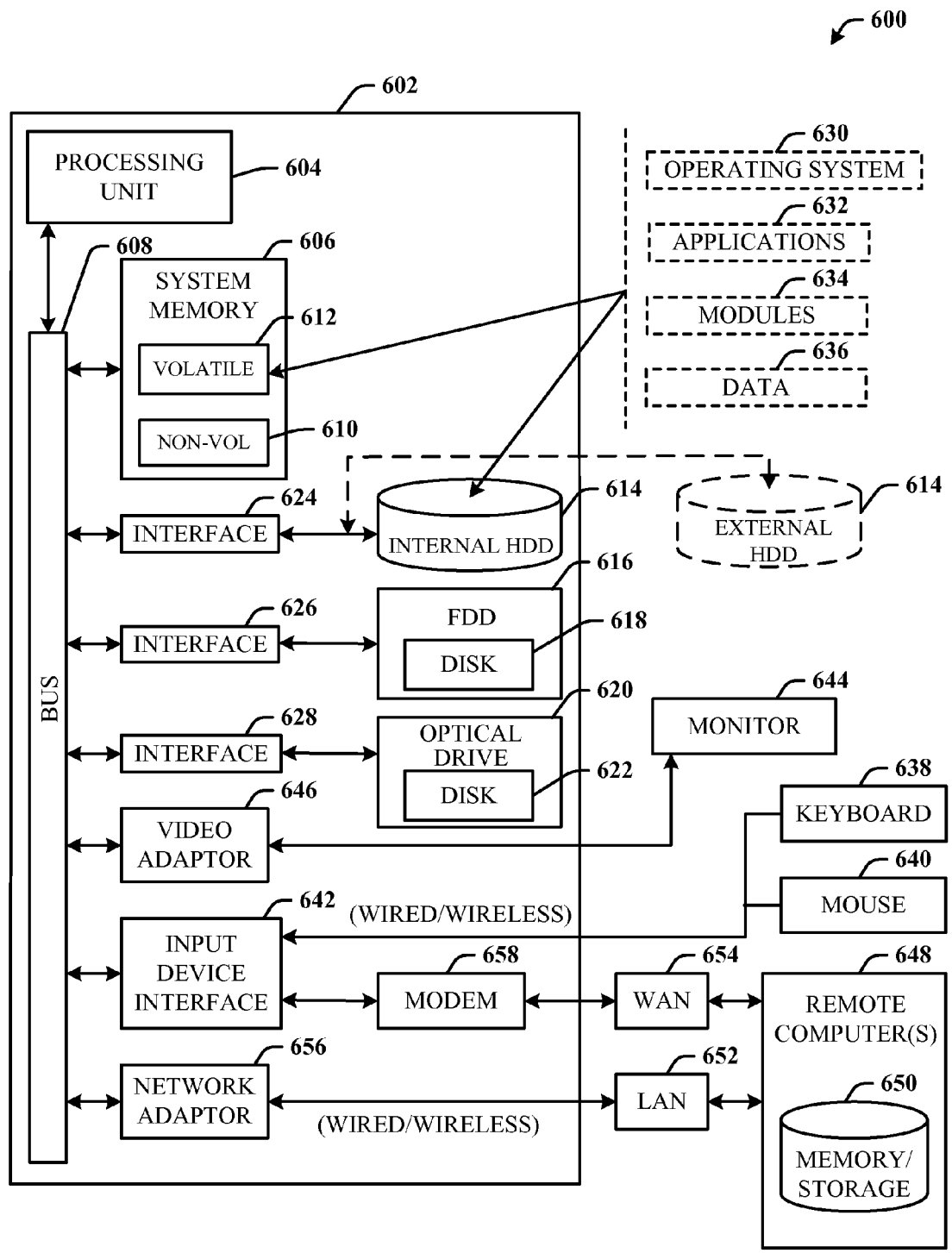
FIG. 6 illustrates a block diagram of a computing system operable to execute redundant data copy management in accordance with the disclosed architecture.

Referring now to FIG. 6, there is illustrated a block diagram of a computing system 600 operable to execute redundant data copy management in accordance with the disclosed architecture. In order to provide additional context for various aspects thereof, FIG. 6 and the following discussion are intended to provide a brief, general description of a suitable computing system 600 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 6, the exemplary computing system 600 for implementing various aspects includes a computer 602 having a processing unit 604, a system memory 606 and a system bus 608. The system bus 608 provides an interface for system components including, but not limited to, the system memory 606 to the processing unit 604. The processing unit 604 can be any of various commercially available processors. Dual microprocessors and other multi-processor architectures may also be employed as the processing unit 604.

The system bus 608 can be any of several types of bus structure that may further interconnect to a memory bus (with or without a memory controller), a peripheral bus, and a local bus using any of a variety of commercially available bus architectures. The system memory 606 can include non-volatile memory (NON-VOL) 610 and/or volatile memory 612 (e.g., random access memory (RAM)). A basic input/output system (BIOS) can be stored in the non-volatile memory 610 (e.g., ROM, EPROM, EEPROM, etc.), which BIOS are the basic routines that help to transfer information between elements within the computer 602, such as during start-up. The volatile memory 612 can also include a high-speed RAM such as static RAM for caching data.

The computer 602 further includes an internal hard disk drive (HDD) 614 (e.g., EIDE, SATA), which internal HDD 614 may also be configured for external use in a suitable chassis, a magnetic floppy disk drive (FDD) 616, (e.g., to read from or write to a removable diskette 618) and an optical disk drive 620, (e.g., reading a CD-ROM disk 622 or, to read from or write to other high capacity optical media such as a DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 602, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 612, including an operating system 630, one or more application programs 632, other program modules 634, and program data 636. Where the computer 602 is employed as a server machine, the one or more application programs 632, other program modules 634, and program data 636 can include the storage component 102, the copy 104, expiration component 110, replay component 202, the transport server 302, the mailbox servers (312 and 318) and associated stores (314 and 316), and methods of FIGS. 4 and 5, for example.

All or portions of the operating system, applications, modules, and/or data can also be cached in the volatile memory 612. It is to be appreciated that the disclosed architecture can be implemented with various commercially available operating systems or combinations of operating systems.

A user can enter commands and information into the computer 602 through one or more wire/wireless input devices, for example, a keyboard 638 and a pointing device, such as a mouse 640. Other input devices (not shown) may include a microphone, an IR remote control, a joystick, a game pad, a stylus pen, touch screen, or the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, etc.

A monitor 644 or other type of display device is also connected to the system bus 608 via an interface, such as a video adaptor 646. In addition to the monitor 644, a computer typically includes other peripheral output devices (not shown), such as speakers, printers, etc.

The computer 602 may operate in a networked environment using logical connections via wire and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, is connected to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 7:
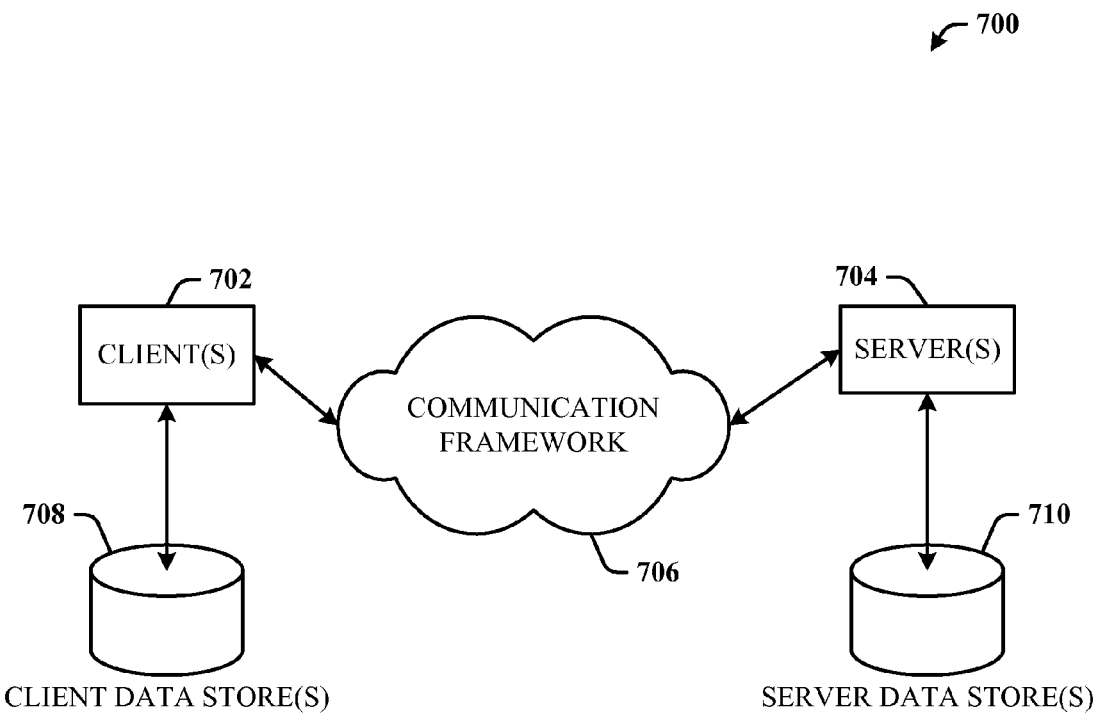
FIG. 7 illustrates a schematic block diagram of an exemplary computing environment that facilitates redundant data copy management for high availability systems.

Referring now to FIG. 7, there is illustrated a schematic block diagram of an exemplary computing environment 700 that facilitates redundant data copy management for high availability systems. The environment 700 includes one or more client(s) 702. The client(s) 702 can be hardware and/or software (e.g., threads, processes, computing devices). The client(s) 702 can house cookie(s) and/or associated contextual information, for example.

The environment 700 also includes one or more server(s) 704. The server(s) 704 can also be hardware and/or software (e.g., threads, processes, computing devices). The servers 704 can house threads to perform transformations by employing the architecture, for example. One possible communication between a client 702 and a server 704 can be in the form of a data packet adapted to be transmitted between two or more computer processes. The data packet may include a cookie and/or associated contextual information, for example. The environment 700 includes a communication framework 706 (e.g., a global communication network such as the Internet) that can be employed to facilitate communications between the client(s) 702 and the server(s) 704.

Communications can be facilitated via a wire (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 704 are operatively connected to one or more server data store(s) 710 that can be employed to store information local to the servers 704. The server(s) 704 can include the transport server 302 and servers of the mail systems 306, for example.

Where the computer 602 is employed as a server machine, the one or more application programs 632, other program modules 634, and program data 636 can include the storage component 102, the copy 104, expiration component 110, replay component 202, the transport server 302, the mailbox servers (312 and 318) and associated stores (314 and 316), and methods of FIGS. 4 and 5, for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented data management system, comprising:
   a storage component to store a copy of data sent to a datastore for storage, wherein one or more parameters of the storage component is selectively configured, with the one or more parameters of the storage component to include an input/output operations per second of the storage component;
   an expiration component to expire the copy at the storage component when a received signal feedback information from the datastore indicates successful storage of the data at the datastore and successful replication of the data at other datastores, the received signal to include timestamp information related to last successfully replicated data and based on a delivery time to the datastore, and the storage component to discard data fully delivered to the datastore before the timestamp to reduce input/output operations of the storage component; and
   a processor to implement the storage component or the expiration component.

2. The system of claim 1, wherein the discarded data is removed from a memory cache of the storage component.

3. The system of claim 1, wherein the data is a log file of messages sent to the datastore, which is a mailbox datastore, and the copy of the log file is deleted from the storage component when the messages of the log file are successfully replicated to the mailbox datastore.

4. The system of claim 1, wherein the data is replicated to the datastore and other datastores asynchronously, and the expiration component expires the copy as soon as successful replication of the data to the datastore and the other datastores.

5. The system of claim 1, further comprising a replay component for replaying the copy in response to a failure in the storage of the data at the datastore, the expiration component expires the copy at the storage component as soon as the received signal indicates successful replay of the copy at the datastore.

6. A computer-implemented data management system, comprising:
   a storage component to store a copy of messages sent to a mailbox server having a mailbox store for storage and replication, wherein one or more parameters of the storage component is selectively configured, with the one or more parameters of the storage component to include an input/output operations per second of the storage component;
   a replay component to replay the copy in response to a failure in replication of the messages at the mailbox server;
   an expiration component to expire the messages at the storage component when feedback information is received from the mailbox server that indicates successful replication of the messages at the mailbox server and at other mailbox stores, the feedback information to include timestamp information related to a first recipient delivery timestamp and a last recipient delivery timestamp, the storage component to discard messages that have been replicated to the mailbox server before the first recipient delivery timestamp or the last recipient delivery timestamp to reduce input/output operations of the storage component; and
   a processor to implement the storage component, the replay component, or the expiration component.

7. The system of claim 6, wherein the storage component, replay component, and expiration component are part of a transport server that routes the messages to the mailbox server.

8. The system of claim 6, wherein the messages are replicated to the mailbox server and other mailbox servers asynchronously, and the expiration component expires the copy as soon as successful replication of the messages to the mailbox server and other mailbox servers occurs.

9. A computer-implemented method of managing data, comprising:
   storing a copy of data, in a storage component, sent to a datastore for replication from one data store to other data stores;
   configuring one or more parameters of the storage component, with the one or more parameters to include an input/output operations per second of the storage component; and
   expiring the copy, based on a timestamp of a last successfully replicated file, when a received signal from the datastore indicates successful replication of the data at the datastore, by expiring messages in the copy that have timestamps before the timestamp of the last successfully replicated message to reduce input/output operations of the storage component, the timestamp based on a delivery time to the other datastores.

10. The method of claim 9, further comprising expiring the copy from a transport server cache memory.

11. The method of claim 9, further comprising communicating mailbox log replication service information as part of the received signal.

12. The method of claim 9, further comprising replaying the copy in response to a failed replication of the data at the datastore, and expiring the copy as soon as re-replication to the datastore is successful, as indicated in the received signal.

13. The method of claim 9, further comprising storing the copy in response to an asynchronous upload operation to the datastore.

* * * * *